United States Patent
Lenart et al.

(10) Patent No.: US 9,042,945 B2
(45) Date of Patent: May 26, 2015

(54) PARALLELIZATION OF APPLICATION LAUNCH AND ACTIVATION OF MOBILE DATA CONNECTION FOR APPLICATIONS REQUIRING REMOTE DATA IN A DEVICE

(71) Applicant: MOTOROLA MOBILITY LLC, Libertyville, IL (US)

(72) Inventors: Andew W. Lenart, Lake Villa, IL (US); Steven M. Knapp, Grayslake, IL (US); Valeriy F. Marchevsky, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 112 days.

(21) Appl. No.: 13/959,932

(22) Filed: Aug. 6, 2013

(65) Prior Publication Data

US 2014/0378189 A1  Dec. 25, 2014

Related U.S. Application Data

(60) Provisional application No. 61/837,234, filed on Jun. 20, 2013.

(51) Int. Cl.
*H04M 1/00* (2006.01)
*H04M 1/725* (2006.01)
*H04W 52/02* (2009.01)

(52) U.S. Cl.
CPC .......... *H04M 1/72563* (2013.01); *H04W 52/02* (2013.01); *H04W 52/0251* (2013.01)

(58) Field of Classification Search
CPC ............ H04M 1/72563; H04W 52/02; H04W 52/0251
USPC ........................................................ 455/574
See application file for complete search history.

(56) References Cited

U.S. PATENT DOCUMENTS

| | | | |
|---|---|---|---|
| 6,628,973 | B1 | 9/2003 | Kikuchi |
| 7,274,929 | B1 | 9/2007 | Banginwar |
| 7,778,269 | B2 | 8/2010 | Munje |
| 7,962,159 | B2 | 6/2011 | Beard et al. |
| 8,635,272 | B2 * | 1/2014 | Reisman ................ 709/203 |
| 8,903,458 | B1 * | 12/2014 | Ho ........................ 455/572 |
| 2006/0277275 | A1 | 12/2006 | Glaenzer |
| 2008/0117851 | A1 | 5/2008 | Irie et al. |
| 2010/0302958 | A1 | 12/2010 | Wietfeldt et al. |
| 2013/0130751 | A1 * | 5/2013 | Vummintala et al. ......... 455/574 |

OTHER PUBLICATIONS

PCT/US2014/043349 International Search Report and Written Opinion, Mailed Oct. 22, 2014.

* cited by examiner

*Primary Examiner* — Christian Hannon
(74) *Attorney, Agent, or Firm* — Troutman Sanders, LLP; James E. Schutz; Rusty C. Close

(57) ABSTRACT

A method and apparatus is provided that launches a selected application on a User Equipment (UE) such that if the launched application requires a mobile data connection and the UE's modem is in a dormant state, then the UE will transition the UE's modem from the dormant state to an active state and/or establish a mobile data connection while or in parallel with the selected application's initialization.

18 Claims, 5 Drawing Sheets

PARALLELIZATION OF APPLICATION LAUNCH AND ACTIVATION OF MOBILE DATA CONNECTION FOR APPLICATIONS REQUIRING REMOTE DATA IN A DEVICE

TECHNICAL FIELD

Embodiments of the invention relate to mobile communication devices having user-initialized applications that require data from a remote server.

BACKGROUND

Mobile data communication devices, including so-called smart phones, tablet computers, and other portable data handling devices (referred to herein generally as a user equipment or UE) are often arranged to access the Internet via a wireless data connection provided by a mobile data network. A UE may use a modem to establish a wireless data connection with the mobile data network. Such a mobile data network typically comprises an array of base stations geographically separated by one another, with the UE communicating with a nearby base station via a wireless signal. An example system currently in use is a so-called Third Generation Long Term Evolution system (3G LTE). Other mobile networks that may also be used are Fourth Generation Long Term Evolution (4G LTE), Global System for mobile Communications (GSM, General Packet Radio Service (GPRS), cdmaOne, CDMA 2000, Evolution-Data Optimized (EV-DO), Enhanced Data Rates for GSM Evolution (EDGE) and Universal Mobile Telecommunications System (UMTS) network technologies.

In order to save energy, a UE may make its modem block or circuitry dormant after a period of time has passed where a wireless data connection is no longer required. When a user is interested in running or using a particular application or "app" on the UE, the user may initialize the application by touching a button, by interacting with a UE user interface (UI) or by speaking a command to the UE. What is needed is an efficient method for changing the UE's modem block or circuitry from a dormant state to an active state so as to help minimize the amount of time it takes for the selected application to display application-related data to the user.

BRIEF DESCRIPTION OF THE DRAWINGS

For a more complete understanding, references now made to the following description taken in conjunction with the accompanying drawings in which.

DETAILED DESCRIPTION

Figure 1:
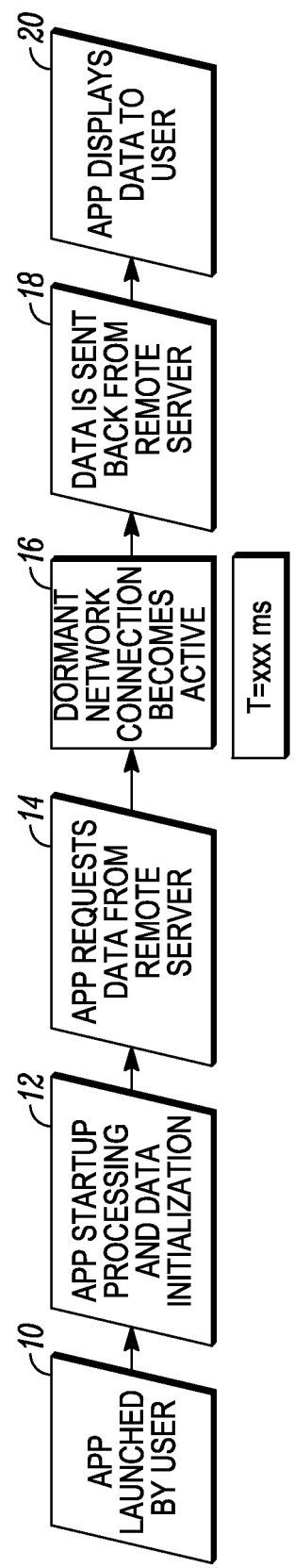
FIG. 1 depicts a basic process flow diagram of a serial application launch cycle by a UE.

Referring now to the drawings, where like numbers are used herein to designate like elements throughout, the various views and embodiments of an exemplary method or apparatus that performs the parallelization of an application launch with the activation of mobile data connections for applications requiring remote data in a UE are illustrated and described. Other possible embodiments are also described. The figures are not necessarily drawn to scale, and in some instances, the drawings have been exaggerated and/or simplified in places for illustrative purposes only. One of ordinary skill in the art will appreciate the many possible applications and variations based on the following examples of possible embodiments.

Referring now to FIG. 1, a general view of an application launch cycle that launches a user selected application in serial with the activation of a mobile data network connection according to the prior art is shown. At step 10, a user launches an application ("app") by, for example, touching an icon or button, speaking or making a predetermined sound that the UE receives or otherwise manipulating the UE in some predetermined fashion. At step 12, the user selected application begins its start-up processing and data initialization, which may include launching various application initialization functions within the UE. For example, the selected application software may be loaded from memory into an active processing area by the framework of the UE. In other embodiments, the application program may be loaded into the UE's memory and the application, via the application program, begins initializing its own data structures within the UE with the help of the UE's framework and processor.

Various applications that operate or run on a UE require a data connection with a data source that is outside of the UE. The data connection may need to be made with a remote server that can be reached via a wireless data communication network over a wireless data network. Such wireless data networks may be included in mobile networks comprising 3G, 4G, LTE, UMTS, HRDP, GSM and other previously, presently or newly created wireless data network technologies. As such, in step 14 the application, via the UE, will request that a socket be opened. The socket will include a request for application related data to be sent to the UE from an application related remote server. For example, if the application is a social network application, the application will begin to initialize itself on the UE and in the process of initializing, the application will request a socket to be opened for the purpose of sending/receiving data from the social network application so that the application can synchronize its data with the social network's information found on a social network related remote server.

At step 16, assuming that the UE's modem circuitry was in a dormant state prior to the application being launched by the user, the UE's modem circuitry or modem block transitions from the dormant to an active state upon receiving the socket request from, for example, the user selected social network application. The modem block "awakens" and establishes an active data network connection over a wireless network or mobile data network. The process of the modem block becoming active takes time as the socket is created and an active network connection is established. Through experimentation, it was found that the minimum time for a network data connection to be established is between about 100 milliseconds to about 400 milliseconds (ms). Additional time is then required for the remote server to be contacted, acknowledge the UE's request for data, and return the requested data via the mobile data network to the modem of the UE for use by the selected application. At step 18, the remote server receives the data request and responds by sending back data that is requested by the selected application operating on the UE. The selected application receives the requested data via the UE's modem block. The received, requested data is provided to the selected application. The application then displays or utilizes the requested data in accordance with the application's programming for the convenience of the user at step 20.

A drawback with this serial application launch and mobile data network connection process cycle, discussed above, is the time used by the UE's modem to switch or transition from a dormant state to an active state so as to bring a mobile data network connection to an active state and thereby connect with a remote server. The initialization and operation of the application would have been much faster if the UE's modem block was in an active state when the application started.

Figure 2:
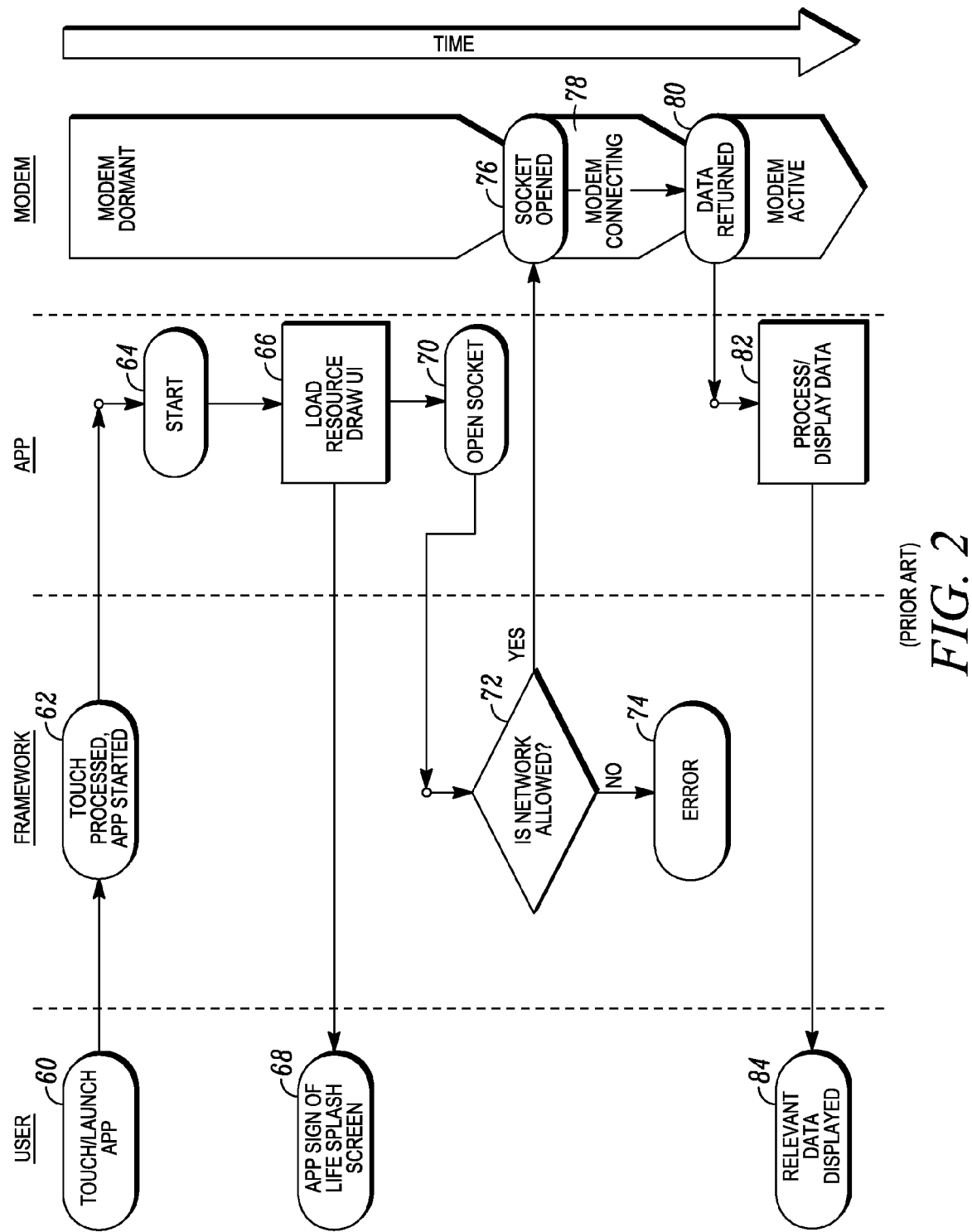
FIG. 2 depicts a more detailed process flow diagram of the serial launching of an application on a UE.

FIG. 2 depicts a more detailed process flow of a serial process of launching an application and activating a mobile data connection on a UE according to the prior art. There are four columns in the figure, which indicate what the user, the UE framework software, the application being launched, and the modem block are each doing in relation to each other with respect to time, which is shown in the right side of the Figure.

The term "framework" refers generally to programs and program layers that may make up at least a portion of the operating system (OS) of a UE. The framework may interact with native libraries that are not directly accessible to an application or other code as well as interact with application programming interfaces (APIs) that interface with the various native libraries in other aspects of the framework. Not all UEs may specifically use a "framework," but the term framework is intended to be synonymous with permutations and derivations of the same found and used within the various operating systems of various UEs. For example, the "framework" may be found in an Android UE, iPhone, Microsoft or Blackberry UE or within other UE software that operates as an application manager.

In FIG. 2, it is important to understand that the UE's modem block and data network connection are in a dormant, non-active, or power-saving state at the beginning of this exemplary process. In other words, the modem block or circuitry within the UE may be in a dormant state due to a predetermined period of time passing wherein the UE did not require a mobile data network connection via the modem block. At some point in time, a user touches, manipulates or otherwise launches an application resident on the UE at step 60. For example, the user may touch an icon on the UE's user interface that initializes a weather application or a social network application. The UE framework at step 62 processes the user's touch or manipulation and determines that a selected application was initialized. The framework via, for example, an API interacts with the UE's memory and as a result, at step 64, the application's software is launched and begins loading its resources at step 66. As the selected application's resources are loaded, the application may begin initializing the user interface (UI) for the selected application. The initialized user interface or splash screen may be initially created on a UE's UI display to inform the user that the selected application is being initialized. For example, in step 68, the user may see a "sign of life" splash screen on the user interface of the UE. There may be an hourglass, spinning circle or other graphic indicating that the selected application is loading and/or waiting for data as part of the splash screen.

At step 70, the application determines that it requires data from a source outside of the UE. The application requests that a socket (in this situation, a wireless data connection over a mobile data network connection) needs to be opened so that data from an outside source, such as a remote server, can be retrieved. At step 72, the framework determines, via an application manifest stored within the UE's memory, whether the selected application has the appropriate permission(s) that allow the application to use UE resources to open a socket and create a mobile data network connection via the modem. If the application manifest indicates that the selected application does not have a necessary permission, at step 74, the framework disallows the selected application from requesting that a socket be opened for the purpose of establishing a data connection within a mobile data network.

Conversely, if the application manifest indicates and/or the framework determines that the selected application has the necessary permission(s) to open a socket at step 72, then the framework of a UE signals the modem block (which is still in a dormant or low power state) to open a socket on the UE at step 76.

As part of the application requesting that a socket be opened, a packet of data is provided to the modem, for example, for requesting data from the application related remote server. The modem at step 78 transitions the dormant mobile data network connection to an active state as the modem also becomes active. Transitioning a dormant modem and data network connection to an active connection can take from about 100 milliseconds to about 400 milliseconds. After the mobile data network connection becomes active, the modem sends the data packet to the application related remote server via the mobile data network connection. The remote server will then log the data received from the selected application and respond to the request by providing a data update or data synchronization or other required data response for the selected application. For example, a weather application related remote server may send updated weather information; a social network related application remote server may send updated social networking information or synchronize social network information with the selected application that is initializing on the UE's modem. As such, at step 80, the data requested by the application is returned from the remote server via the mobile data network connection to the modem and ultimately provided to the selected application.

It has been determined via experimentation that it takes from about 120 milliseconds to about 1000 milliseconds for a UE modem to become active, open a socket, establish an active mobile data network connection, send a packet of data to a remote server, and receive a data response from that remote server. This overall time varies based on the mobile data network connection, the Internet speed and variables associated with the functions of the remote server. Regardless, opening of a socket and bringing the modem block from a dormant state to an active in steps 76 and 78 generally takes a minimum of about 200 milliseconds to about 400 milliseconds.

At step 82, the selected application obtains or receives the requested data from the modem. The application then stores, processes or renders the received requested data as needed in accordance with the application program and initialization. Finally, at step 84, the appropriate data information is rendered and displayed to the user in accordance with the application-generated user interface on the UE.

It would be desirable for there to be an additional technique, process, or method that enables the user selected application to be launched while the modem and the mobile data network connection are dormant yet, shortens the overall amount of time required for the initialization of the application and the activation of a mobile data connection for the selected application.

In an embodiment, the overall time from a selected application launch to the selected application displaying data to the user is shortened with respect to the above described method. In one embodiment, a UE initiated ping transitions the modem and mobile data network connection to an active state in parallel with the application launch. Thus, the mobile data network connection can be brought from a dormant state to an active state while the application is initializing to save time, e.g., from 200 to about 400 milliseconds. A data request by the application can then be made immediately with one or more remote servers enabling the application to display data on the UI more quickly than described in the serial techniques of FIGS. 1 and 2. The relative time savings may vary based on the mobile data network connection technology that is used as well as on the needs of the particular application being launched. In testing on Android Jelly Bean 4.1, an embodiment saved at least about 250 milliseconds during the launch of an Android Facebook application.

Figure 3:
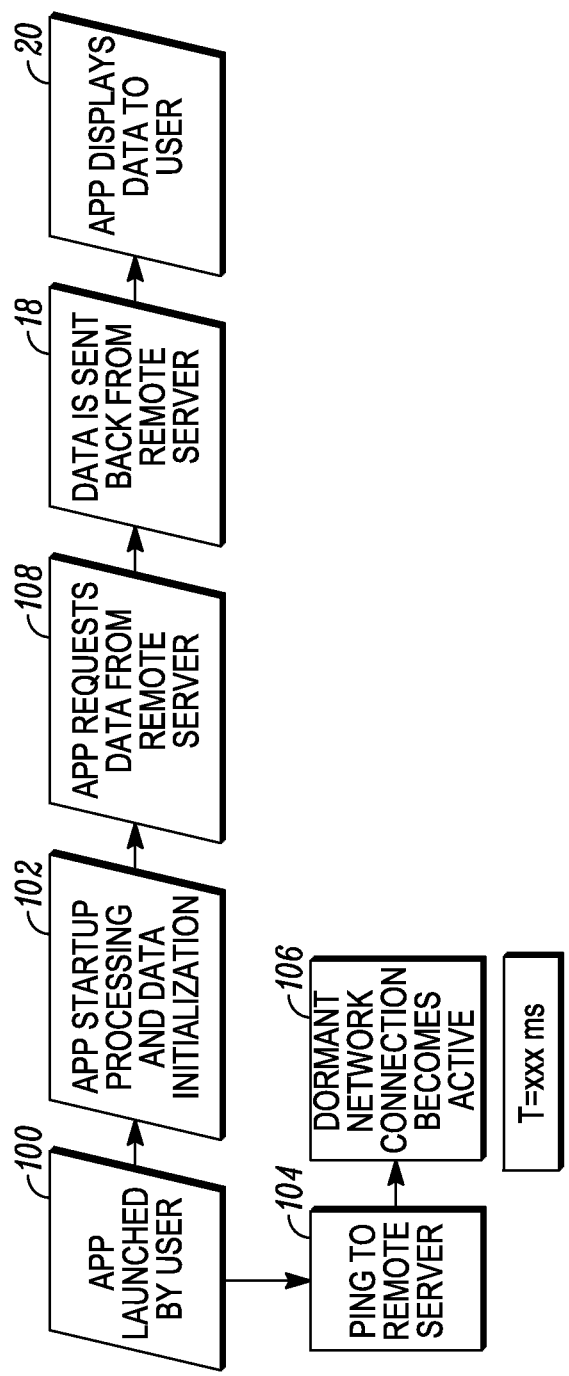
FIG. 3 depicts a general process flow diagram of a parallelization of an application launch and the activation of a mobile data connection.

Referring now to FIG. 3, a process flow chart of an embodiment providing parallelization of an application launch and activation of a mobile data connection is provided. At step 100, an application on a UE is launched by a user while the UE is in a dormant network communication mode. When a UE is in a dormant network communication mode, the data modem of the UE is generally in a power-saving or dormant state. In some embodiments, the user may not have been using the UE for some period of time, and as a result, the UE transitioned into a power-saving mode. At some point in time, the user touches an icon, button or manipulates the UE in some fashion via the user interface of the UE. In response thereto, the framework of the UE senses that an application has been selected and then checks an application manifest, which stores information about what UE resources each application is authorized to use, to determine whether the selected application requires a data connection via a mobile data network.

For example, that when an application is installed in a UE, such as an Android based smart phone, an application related file is created and stored in an application manifest. The application manifest keeps track of essential information about each application, including a set of permissions associated with the application that enable it to access various protected parts, circuitry or resources of the UE via an API and other application and functionalities therein. For example, the selected application, in order to function properly, may require access to a data connection for the purpose of sending and receiving pertinent data to a remote server. In other embodiments, GPS access may be necessary so as to enable the application to determine the geographic location of the UE. Other examples include without limitation needing access to the UE's address book, Wi-Fi access, or to other functions of the UE. It is understood that here and throughout this document the examples provided are merely representative of possibilities and are not limiting. By using the application manifest, an embodiment can quickly determine whether the selected application may require a data connection over a mobile data network.

In embodiments, there is a parallelization of a selected application launch and activation of a mobile data network connection. Thus steps 102 and 104 are performed substantially in parallel, substantially simultaneously or during the same time. At step 102, the application start-up process begins and the selected application's initialization functions also begin performing substantially simultaneously. The application is loaded into the UE's processor memory and data initialization of the application takes place. At substantially the same time, at step 104, a command to ping a remote server is initialized or a basic data request is initialized in order to transition the UE's dormant modem to an active state. In some embodiments after the modem is transitioned to an active state, the ping is sent to a remote server associated with the selected application. At step 106, the dormant network connection becomes active and connects to the remote server or the Internet. In other embodiments, instead of sending a ping, a first data packet or the sending of an IP data packet to the Internet may be initially performed at step 104. At step 106, the dormant network connection becomes active as the modem on the UE transitions from a dormant state to an active state. By the time the selected application has initialized to the point where it is ready to request data from a specified remote server, at step 108, the dormant network connection has become an active mobile data network connection and there is no delay with initializing the selected application due to the initialization or changing of the mobile data network connection from a dormant state to an active state associated. In other words, the process of initializing the application does not require waiting for a dormant mobile data network connection to become active. At this point, steps 18 and 20 are substantially identical to steps 18 and 20 in FIG. 1. The result is a reduction in the overall time from an application launch to the application displaying data to the user of the UE. The reduction of overall time is established by making the mobile data network connection active in parallel with the initialization of the selected application's launch. Time is saved because the selected application does not have to wait for the mobile data network connection to transition from a dormant state to an active state. Embodiments make the mobile data network connection immediately available to a selected application when the initialization time of the selected application is greater than the time needed for the modem to transition the mobile data network connection from a dormant to an active state.

It should also be noted that in various embodiments at step 104, after a ping or any type of IP data traffic is sent to the Internet or a remote server, the UE, the framework, the modem and the selected application are each unconcerned about any communication response or data returned to the UE via the mobile data network connection in response thereto. In embodiments, the request or operation of initiating a ping function is done to initiate the transition of the network modem function from an inactive state or dormant state to an active state prior to the selected application initializing to the point where it requests data from a remote server in step 108.

Embodiments save a minimum of approximately 200 milliseconds of (i.e. from about 120 to about 2,000 milliseconds) by (1) checking the application manifest, (2) determining that the selected application has authorization to connect to a data network, and (3) sending an initial IP data packet to a remote server or application related remote server in parallel with the initialization and/or start-up processing of a selected application. From experimentation, it appears that the variation from about 120 milliseconds to about 2,000 milliseconds in time savings appears to be related to data network response times and remote server response times to the UE's initial ping or IP data packet initialization. For example, if an application related remote server receives the initial IP data packet, the data path, and possible upfront processing that identifies the user and the particular application to the application related server may increase the speed of processing data received or sent from the remote server back to the selected application when the selected application is requesting data from the remote server in step 108 and data is being sent back from the remote server in step 18.

In effect, at step 108, the selected application is requesting data from the remote server via an active data connection. It is as if the data connection had not been in a dormant state prior the user's selection of the selected application. Thus, whether the selected application opens a single data socket or multiple data sockets, the time saved by opening one or more data sockets on an active data network modem is always significant when compared to performing the same task in serial and starting with an inactive or dormant modem and mobile data network connection.

Figure 4:
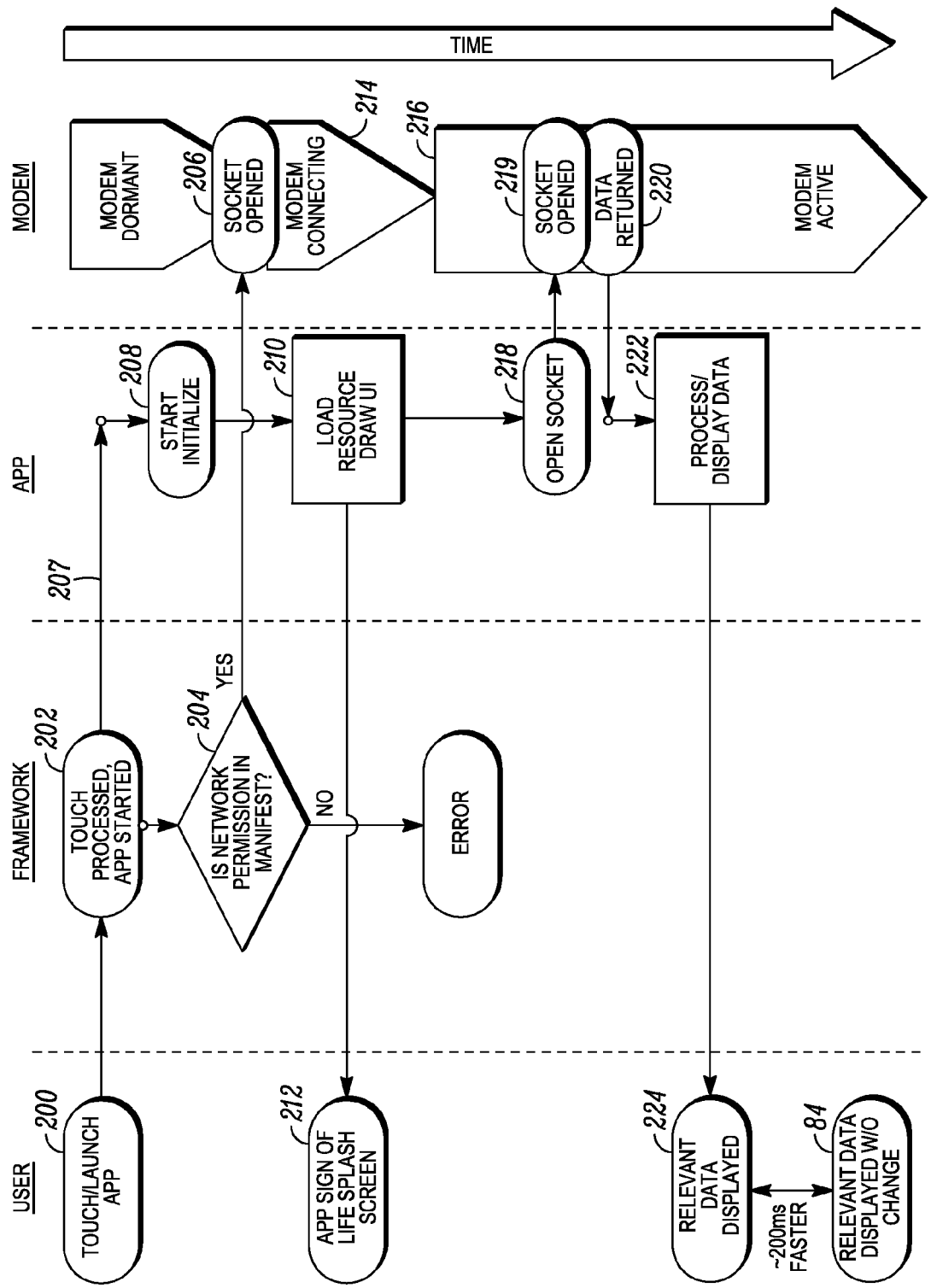
FIG. 4 depicts a more detailed process flow diagram of the parallelization of an application launch and activation of a mobile data connection of a UE.

Referring now to FIG. 4, a more detailed flow diagram of an embodiment that parallelizes an application launch and the activation of a mobile data connection is provided. In FIG. 4 there are four columns. The first column is a User column, which represents the user's perception of and/or how the user is interacting with the UE. The second column is a Framework column, which represents the application framework software that manages the applications in the launch thereof. The framework block in a UE, as discussed earlier, is software and/or electronics contained in the UE. The third column represents the Application or App that is selected, such as the Facebook application, a weather application, a diet application, a game application, a shopping application, a news application, or any other type of application that is stored and run on a UE and may or may not require a mobile data network connection to an external remote server. In various embodiments, an application will have associated therewith a manifest file stored in the application manifest within the UE. The application manifest is normally stored within a memory of the UE. The fourth column is the UE's modem block, which is a software and/or hardware block contained within the UE. The modem manages the data network resource connections for which applications and other operations on the UE may establish data communication connections. The modem block consumes a significant amount of energy while active. When the applications and other functions of the UE have no need for a mobile data network connection for a predetermined period of time, to save energy, the modem block will power down from an active state to a dormant state.

Still referring to FIG. 4, it is understood that initially the modem is in a dormant state. At step 200, the user touches an icon, button or manipulates the UE in order to launch a selected application, such as a Facebook application or other application that is resident on the user's UE. At step 202, the framework receives a request to launch the selected application and in response thereto sets two parallel processes 205, 207 into action. The first parallel process 205, at step 204, checks the application manifest. The framework determines from the application manifest whether the selected application has permission to make a mobile data network connection. If there is no permission for the selected application to make a mobile data network connection in the application manifest, then this first parallel branch 205 is completed, and there is no need to set up a mobile data network connection or alter the state of the modem from a dormant state to an active state.

Conversely, if on the first parallel branch 205, at step 204, the manifest indicates that the selected application has permission(s) to establish a mobile data network connection, then a ping, an http/get to a remote server or substantially any type of outgoing IP traffic/packet data is requested by the framework to be sent out by the modem. At step 206, upon receipt of the request for sending an outgoing IP traffic, ping or otherwise, a first socket is opened. A socket is an application's interface to the mobile data network communication resource via the modem. In some embodiments, the first socket is an Internet socket.

In the meantime, on the first parallel or simultaneous process branch 205 at step 214, the modem, in response to the first socket being opened at step 206 proceeds through the process of connecting and establishing an active mobile data network connection. In doing so, the modem, which was in a dormant state transitions to an active state at step 216.

While the first parallel or simultaneous process branch 205 proceeds to (a) open a first socket, (b) transition the modem from a dormant state to an active state, and/or (c) establish a mobile network connection, the second parallel or simultaneous processing branch is initializing the selected application. The second parallel or simultaneous processing branch 207, at step 208, begins initialization of the selected application. During the initialization of a selected application, icons, bitmaps and graphics associated with the selected application are initialized and loaded for execution and display on the user interface (UI). At step 210, additional application resources are loaded on the UE and the UI interface is provided splash screen information for display and/or audio.

At step 212, as the application is initialized, a splash screen for the selected application may be displayed on the UI for the user to view. A splash screen is generally an image that appears while an application is loading or initializing. A splash screen may also be an introduction screen that is used to describe or visually introduce the application that is being loaded.

Thus in an exemplary embodiment, a first process branch opens a first socket so that a dormant modem will transition from its dormant state to an active state while, during the same time or in parallel with the selected application initializing its resources and being loaded so as to produce the selected application's splash screen on the UI for the user to view and have its needed resources initialized. The progression of opening the first socket 206 and bringing the dormant modem to an active state 216 takes a minimum of about a 100 milliseconds to about 400 milliseconds. The initialization of the selected application in the loading of its resources also takes a minimum of about 120 milliseconds to about 400 milliseconds. As such, at about the same time or after the modem transitions to an active state and has established an active mobile data network connection, the selected application, at step 218, is ready to open a second socket to make a data request to an application related remote server.

Since the modem is already in an active state 216, at step 219, the second socket requested by the application is immediately opened without any latency because there is no need to transition the state of the modem or to establish an active mobile data network connection. The initial data request from the selected application to the application related remote server is immediately sent. In response thereto, the application related remote server (for example, Facebook's or the Weather Channel's remote server that hosts data for various application users) will respond to the selected application's data request and send the requested data by way of the mobile data network connection to the modem at step 220. No delay is created by transitioning the state of the UE's modem. The data requested by the application and subsequently provided by the remote server is received by the modem via the second socket.

At step 222, the received data is processed, prepared, and rendered by the selected application for storage and/or for display on the UI. The application renders the received data and displays the received data as part of the application user interface to the user at step 224. It was found that because the activation of the mobile data network is performed in parallel with (or changing the same time as) the selected application launch, the relevant application related data received from the remote server is displayed to the user in step 224 at least about 200 milliseconds to about 1,000 milliseconds faster than the same relevant data would have been displayed to the user in step 84 of FIG. 2.

In various embodiments, the mobile data network connection may be established or configured on any one or more wireless communication network technologies including, but not limited to, 3G, 4G, UMTS, HRPD, LTE, GSM, HSDPA, cdmaONE/CDMA2000/EV-DO, LTE-SAE or OFDMA networks.

Figure 5:
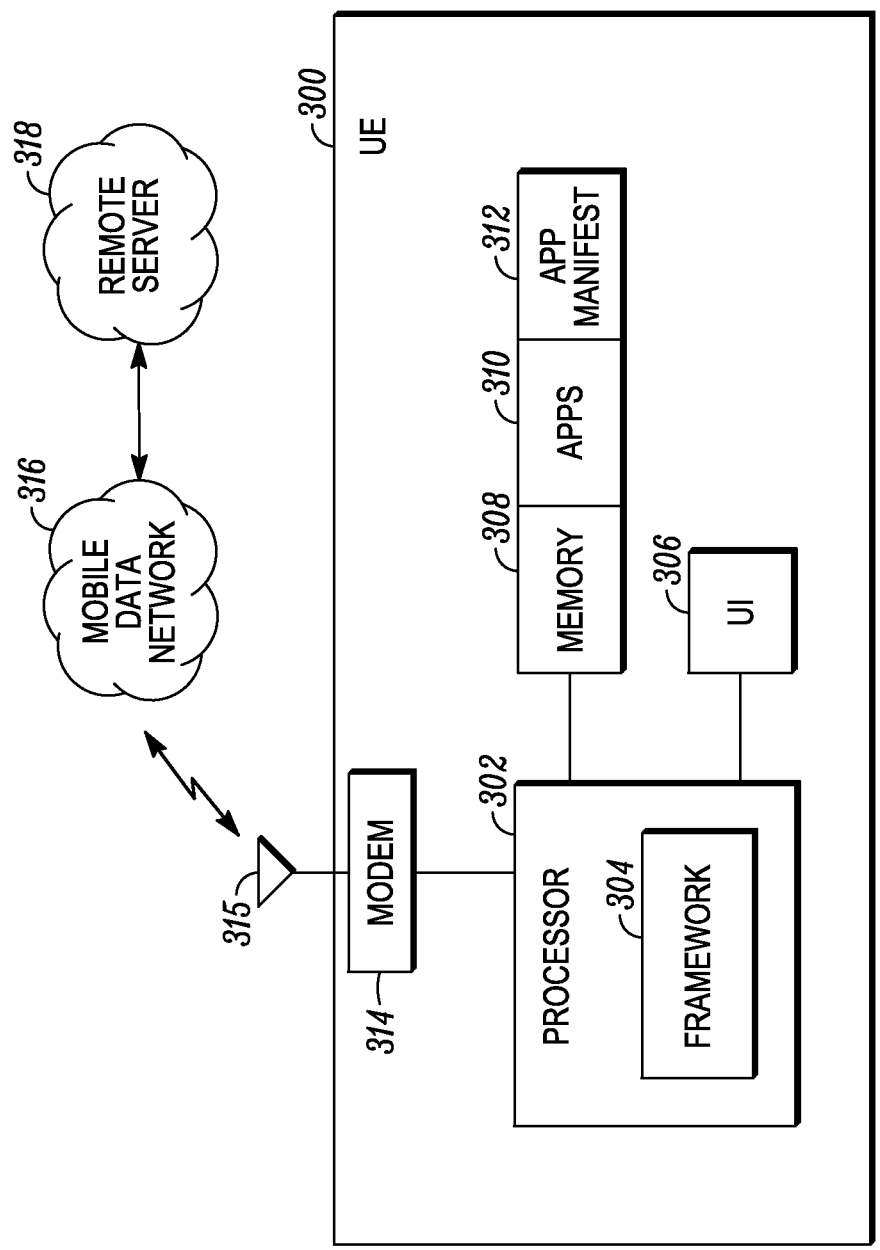
FIG. 5 depicts a basic block diagram of a UE in accordance with an embodiment.

Referring to now to FIG. 5, an exemplary UE 300 configured to perform an exemplary parallelization of an application launch and activation of a mobile data connection for applications that require remote data on a UE is shown. The UE 300 has a processor 302 on which the framework 304 runs. A user interface 306 is connected to the processor and allows a user to effectively interface with a UE 300 via a display, buttons, UE manipulations, voice, and other common user interface techniques. A memory 308 is configured to store one or more applications or applications that can be initialized and operational to run on the UE, via the framework 304 and processor 302. For each application 310 stored in the memory, there is an application manifest file stored in the application manifest 312. The application manifest 312 comprises essential information about each application to the framework 304 including the resources that the particular application 310 must have available to it in order for it to run properly in the UE 300. The application manifest, among other things, declares which permissions the application must have in order to access parts of the framework 304 API as well as to interact with other applications running on the UE. A permission is generally a restriction that either limits or allows access to a part of code or data on the UE device. In some embodiments, the framework 304 must determine whether a selected application 310 has a permission that allows or disallows the selected application to establish a mobile data network connection in order to obtain data from, for example, a remote server or other remote data storage device or cloud.

The exemplary UE 300 also has a modem block 314, which includes a transceiver that includes both analog and digital circuitry and in some embodiments a microprocessor. The modem block 314 is configurable to be dormant or active. While dormant, the modem 314 uses an insignificant amount of energy. While active, the modem block 314, via and antenna 315 can establish a mobile data network connection so that an application that is initialized or running on a UE can request or receive data via a mobile data network connection 316 from a remote server 318. The remote server 318, in some embodiments, may be associated or related to a selected application 310 so as to be able to provide requested data required specifically by the selected application 310 for the display by the UI 306 to the user.

Although illustrated embodiments of the invention have been described, foregoing description is not intended to limit the scope of the invention. Various modifications and combinations of embodiments, as well as other embodiments, of the invention will be apparent to persons skilled in the art upon reference to this description. It is therefore intended that the appended claims incorporate any such modifications or embodiments.

It will also be appreciated by those skilled in the art having the benefit of this disclosure that the embodiments and method for activation of a mobile data network in parallel with an application launch or initialization on a data enabled UE provides features and techniques that speed up the overall time from an application launch to the application displaying data to a user. It should be understood that the drawings and detailed description herein are to be regarded in an illustrative rather than in a restrictive manner, and are not intended to be limiting to the particular forms and examples disclosed. On the contrary, included are any further modifications, changes, rearrangements, substitutions, alternatives, design choices and embodiments apparent to those of ordinary skill in the art, without departing from the conceptual design, method and scope hereof as defined by the following claims. Thus it is intended that the following claims be interpreted to embrace all such further modifications, changes, rearrangements, substitutions, alternatives, design choices and embodiments.

What is claimed is:

1. A method of launching an application by a user equipment ("UE") when a mobile data network connection of the UE is in a dormant state, the method comprising:
    initializing a selected application by a user of the UE while a modem within the UE is in a dormant state;
    requesting, in response to the initializing of the selected application, that a first socket is opened while the selected application is initializing, the first socket configured to establish a mobile network data connection;
    changing the state of the modem from a dormant modem state to an active modem state, opening the first socket and establishing the mobile network data connection between the modem and a mobile communication network while the selected application is initializing;
    requesting, by the selected application, that a second socket is opened, the second socket configured to request selected application related data from a remote server;
    opening the second socket by the modem substantially immediately upon the request by the selected application, the modem using the mobile network data connection; and
    receiving, by the modem, selected application related data from the remote server over the mobile network data connection.

2. The method of claim 1, wherein prior to requesting that the first socket is opened, the method further comprises checking, by the framework to determine whether the selected application has a permission to make a mobile network data connection.

3. The method of claim 1, wherein the first socket is configured to establish the mobile network data connection by pinging a remote server.

4. The method of claim 1, wherein the first socket is configured to establish the mobile network data connection by requesting the performance of an IP data being sent to the internet via the network data connection.

5. The method of claim 1, further comprising rendering, by the application, the received selected application related data for display on a user interface of the UE.

6. The method of claim 1, wherein initializing the selected application comprises:
    loading selected application related resources available on the UE; and
    initializing a user interface display.

7. The method of claim 6, wherein initializing the user interface display comprises providing a selected application related splash screen on the user interface display.

8. The method of claim 1, wherein requesting is performed by a framework of the UE.

9. A method of initializing a selected application and activating a mobile network data connection in parallel on a UE wherein the UE's modem is in a dormant state, the method comprising:
    sensing, by a user interface of the UE, that an application is selected by a user;
    simultaneously, by an application manager of the UE, initializing the selected application and requesting that an IP data is sent to a remote server;

changing the state of the modem from a dormant state to an active state such that a network data connection is established;

requesting, by the selected application, data from a remote server via the modem in the active state and the network data connection;

receiving the requested data via the modem and the network data connection;

rendering the received data by the selected application; and displaying the rendered, received data on the user interface.

10. The method of claim 9, wherein the step of simultaneously initializing further comprises checking, by the application manager, whether the selected application has permission for network data communications.

11. The method of claim 10, wherein checking whether the selected application has permission for network communications comprises checking an application manifest stored in memory of the UE.

12. The method of claim 9, wherein requesting that an IP data is sent to a remote server comprises pinging the remote server.

13. The method of claim 9, wherein requesting that an IP data is sent to a remote server further comprises disregarding whether the remote server responds to the IP data sent.

14. The method of claim 9, wherein initializing the selected application further comprises:

loading selected application related resources available on the UE; and initializing a user interface display.

15. A UE comprising:

a user interface configured to accept input from a user and display information to the user;

a memory configured to store at least one application;

a modem block configured to be in a dormant state after a predetermined time when no network data connection is needed by the UE and configured to switch to an active state when a socket requiring a network data connection is requested;

a framework configured to determine that an application was selected by a user interfacing with the user interface and in response to thereto, substantially simultaneously (1) request that a first socket is opened by the modem block to change the state of the modem from a dormant state to an active state and establish a network data connection, and (2) inform the selected application to initialize;

wherein the modem is changed to an active state and establishes the network data connection prior to the application requesting data from a remote server via a second socket that requires the network data connection.

16. The UE of claim 15, wherein the memory is further configured to store an application manifest, the application manifest comprising permission(s) associated with each application, and wherein the framework is further configured to check the application manifest to determine whether the selected application has a permission to establish a network data connection.

17. The UE of claim 15, wherein when the first socket is opened, an IP data is sent to a remote server via the network data connection and any response from the remote server is disregarded by the UE.

18. The UE of claim 15, wherein the selected application is configured to initialize by initializing application related resources on the UE and displaying a splash screen on the user interface.

* * * * *